United States Patent Office 3,471,181
Patented Oct. 7, 1969

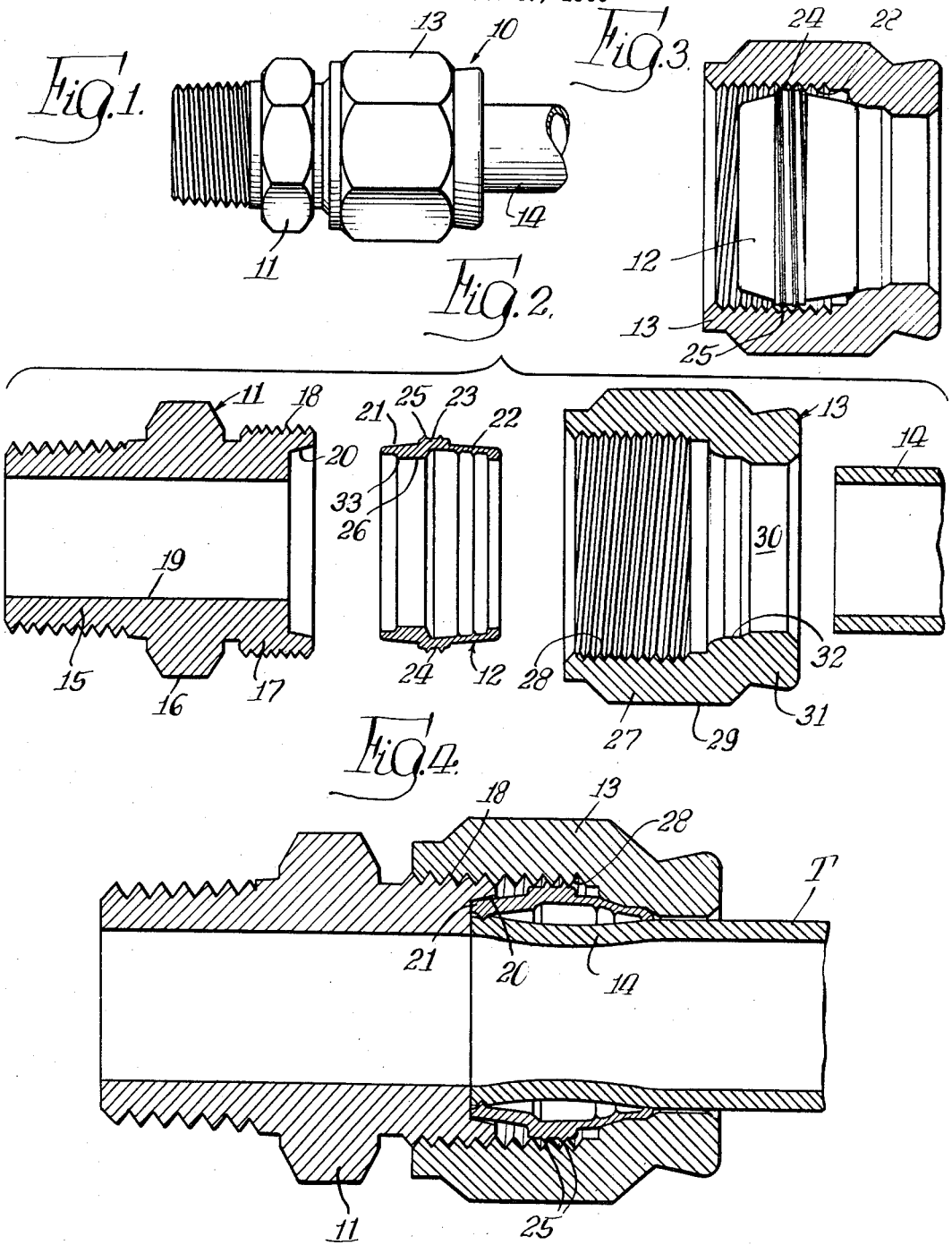

3,471,181
FITTING
Ferdinand Fuentes, Wonder Lake, Ill., assignor to Imperial-Eastman Corporation, a corporation of Illinois
Filed Oct. 13, 1966, Ser. No. 586,481
Int. Cl. F16l 19/06, 19/08, 21/02, 17/00
U.S. Cl. 285—341          2 Claims

ABSTRACT OF THE DISCLOSURE

A tube fitting having a sleeve adapted to be sealingly connected to the end of the tube by means of a nut pressing a portion of the sleeve against a sealing surface of a body member of the fitting and against a portion of the tube end. The sleeve is provided with means for maintaining a coaxial relationship of the sleeve to the nut member for facilitated make-up of the fitting in the form of a thread on the sleeve loosely received in the thread of the nut member. The sleeve thread is arranged to have threaded engagement with the nut thread fully during make-up of the fitting to assure the desired aligned relationship.

---

This invention relates to tube fittings and in particular to fittings for use with straight ended tubes.

In one conventional form of fitting for connection to a straight ended tube, such as a metal tube, an annular sleeve is provided to be constrictively sealingly connected to the tube end as an incident of the threaded advance of a nut member of the tube on a body member thereof. The nut member not only contrictively seals the sleeve to the tube end but also urges the sleeve against a seating portion of the body to complete a seal between the tube end and the body.

A problem arises in such fittings in that it is difficult to maintain the sleeve in accurate coaxial alignment with the nut and body members during make-up of the fitting as the sleeve is disposed internally of the nut during such make-up. Another problem in such fittings is that it is highly desirable to maintain the sleeve in loose assembly with the nut prior to make-up of the fitting for facilitated stocking and for facilitated make-up of the fitting. One attempt to solve the assembly problem has been to provide on the sleeve an annular bead which projects radially loosely into the internal thread of the nut member. Providing such an annular bead, rather than solving the problem of coaxial alignment of the sleeve relative to the nut member, actually causes disalignment as the annular bead tends to be skewed by the engagement thereof with the axially inclined helical thread of the nut member.

The present invention comprehends an improved fitting solving this continuing and vexatious problem in a novel and simple manner. Thus, a principal object of the present invention is the provision of a new and improved tube fitting arranged to maintain a sleeve and nut member thereof in loose assembly while concurrently maintaining the sleeve in accurate coaxial alignment relationship to the nut member for improved facilitated make-up of the fitting.

Another object of the invention is the provision of such a tube fitting wherein an external thread is provided on the sleeve which is loosely received in the internal thread of the nut member for providing the desired maintained assembly and accurate alignment therebetween.

A further object of the invention is the provision of such a tube fitting wherein the thread of the sleeve is substantially smaller than the thread of the nut member while having the same pitch as the thread of the nut member thereby providing an improved loosely maintained assembly and concurrent axial alignment therebetween.

Still another object of the invention is the provision of such a tube fitting wherein the root diameter of the sleeve thread is approximately similar to the tip diameter of the nut thread whereby desired accurate coaxial alignment of the sleeve relative to the nut member is obtained.

A yet further object of the invention is the provision of such a tube fitting wherein the sleeve thread extends at least approximately two turns to provide improved maintained assembly and accurate axial alignment.

Summary of the invention

In summary, the invention comprehends an improved fitting wherein the sleeve is provided with an external thread maintaining coaxial alignment thereof relative to the nut member prior to and fully during make-up of the fitting.

Other features and advantages of the invention will be apparent from the following description taken in connection with the accompanying drawing wherein:

FIGURE 1 is a side elevation of a tube fitting embodying the invention;

FIGURE 2 is an enlarged exploded diametric section thereof;

FIGURE 3 is a diametric section illustrating the arrangement of the sleeve in the nut member prior to the make-up of the fitting; and FIGURE 4 is a diametric section illustrating the arrangement of the fitting as upon completion of the make-up thereof.

In the exemplary embodiment of the invention as disclosed in the drawing, a tube fitting generally designated 10 is shown to comprise a body 11, a sleeve 12, and a nut 13. The sleeve 12 is adapted to be constricted onto the end 14 of a tube T, such as a metal tube and, upon completion of the make-up of the fitting, as shown in FIGURE 4 of the drawing, to provide a sealed connection of the tube end to the body. As indicated briefly above, the sleeve 12 is arranged to be loosely assembled with the nut 13, prior to and during makeup of the fitting, as illustrated in FIGURE 3.

Referring now more specifically to FIGURE 2, the body 11 comprises an annular member having an externally threaded outer portion 15, a hexagonally externally flatted mid-portion 16, and an inner portion 17 provided with an external thread 18. A bore 19 extends coaxially through the body member and is provided at the inner end with a frusto-conical seat 20.

The sleeve 12 comprises an annular member having an outer nose 21 adapted to have wedged sealed engagement with the seat 20 in the made-up arrangement of the fitting, as shown in FIGURE 4. The sleeve is further provided with a constrictible inner end 22 adapted to be urged into constricted sealing engagement with the tube end 14 in the made-up arrangement of the fitting. The sleeve 12 further includes a rigid substantially unconstrictible mid-portion 23 defining an external right circular cylindrical outer surface 24. A small thread 25 upstands from surface 24. A pitch of thread 25 is preferably the same as that of the thread 18 and, as shown in FIGURE 2, the thread 25 may extend for approximately two turns. A stepped bore 26 extends coaxially through the sleeve 12 for receiving the tube end 14.

Nut 13 comprises an annular member having an inner portion 27 defining an internal thread 28 having the same pitch as thread 18 and thread 25 for threaded engagement with thread 18. The nut portion 27 is externally hexagonally flatted as at 29. An axial bore 30 extends through the nut 13 and at the inner portion 31 of the nut is defined by a camming surface 32. The camming surface 32 is arranged to bear against the sleeve portion 22 and as an incident of the threaded advancement of the nut 13 on the body thread 18 urge the sleeve nose 21 sealingly against the body seat 20 and constrict the sleeve portion 22 into sealed engagement with the tube end 14.

As best seen in FIGURE 3, the cylindrical surface 24 has a diameter similar to the internal tip diameter of the thread 28 of the nut 13. As the thread 25 upstands from the surface 24, the diameter of the thread 25 is similar to the tip diameter of the nut thread 28. However, as shown in FIGURE 3, the outer tip diameter of the thread 25 is substantially smaller than the outer root diameter of the thread 28, and, thus, the thread 25 is substantially smaller than the groove of the thread 28 whereby the thread 25 may have limited axial movement within the thread 28 while yet the sleeve 12 is effectively maintained in accurate coaxial alignment with the nut 13 at all times. In the illustrated embodiment, the axial dimension of hte root of the thread 25 is less than one-half the pitch of the thread 28 so that the sleeve may have an axial movement within the nut thread of at least approximately one-half the pitch thereof.

In making up the fitting, the loosely assembled sleeve 12 and nut 13, as shown in FIGURE 3, are firstly installed over the end 14 of the tube T. The tube end is then brought to adjacent the end 17 of the body 11 and the nut 13 is then threaded onto the thread 18 of the body 11. As the nut is advanced on the body thread 18, the sleeve is carried with the nut to bring the nose 21 thereof into engagement with the body seat 20. The engagement with frustoconial seat 20 prevents further free advancement of the sleeve whereupon further rotation of the nut 13 causes the nut thread 28 to not only thread onto the body thread 18 but also to thread over the thread 25 of the sleeve. This threaded advancement of the nut 13 causes the sleeve to be effectively maintained in accurate coaxial alignment with the nut 13 and the body seat 20 as the advancement of the nut causes camming surface 32 thereof to axially advance the sleeve to constrictively wedge the nose 21 in the frustoconical seat 20 and concurrently to constrict the sleeve portion 22 into sealed engagement with the tube end 14. Upon complete make-up of the fitting, as shown in FIGURE 4, the nose is constricted to urge a biting edge 33 at the outer end of the sleeve into the tube end 14 to provide further improved resistance of the fitting to axial pull-out of the tube T from the fitting.

If it is desired to disassemble the fitting, the nut 13 is merely backed off from the body thread 18, as it may readily thread past the sleeve threads 25. Upon disengagement of the nut thread 28 from the body thread 18, the tube end 14, with the sleeve 12 fixedly secured thereto, may be removed from association with the body 11. To subsequently remake the fitting, the tube end is again brought to the body end 17 and the nut 13 again threaded over the sleeve thread 25 and onto the body thread 18 to restore the fully made-up condition illustrated in FIGURE 4.

As the sleeve 12 is accurately coaxially retained in the nut 13, facilitated make-up of the fitting is provided. The problem of difficulty of maintaining accurate axial alignment of the sleeeve, as found in conventional fittings of this type, is effectively eliminated thereby making the fitting substantially fool-proof even in the hands of relatively inexperienced users.

The fitting is extremely simple and economical of construction and provides facilitated disconnection and reconnection. As the sleeve is effectively positively associated with the tube end, the improved coaction between the sleeve thread 25 and nut thread 28 assures an automatic accurate recentering of the tube end, as well as the sleeve, relative to the body 11 in remaking of the fitting.

I claim:

1. In a fitting defining in a fully made-up disposition thereof,

A body having a through bore and an externally threaded end concentric of said bore, an annular sleeve provided with constrictible means having sealed connection to a tube end inserted thereinto with the distal end of the tube engaging said body coaxially of said bore, sealing means sealingly engaging said body end, and a portion defining an external thread having the same pitch as said body thread, and an annular nut having an internal thread engaging said body threaded end, a camming portion engaging said sleeve to urge said constrictible means into sealed engagement with the tube end and said sealing means sealingly against said body end as an incident of the threaded advance of said nut thread on said body threaded end, said external thread of the sleeve being arranged to be loosely threaded into said nut thread to retain said sleeve and nut in assembled relationship prior to and fully during make-up of the fitting while permitting said nut thread to move threadedly about said sleeve thread when said sleeve sealing means engages said body thereby to permit axial movement of said nut relative to said sleeve whereby said sleeve may be substantially rotatably fixed as said nut is advanced to the fully made-up disposition, the root diameter of said sleeve thread being substantially similar to the tip diameter of the nut thread whereby said sleeve is retained accurately coaxially within the nut during make-up of the fitting.

2. In a fitting defining in a fully made-up disposition thereof, a body having a through bore and an externally threaded end concentric of said bore, an annular sleeve provided with constrictible means having sealed connection to a tube end inserted thereinto with the distal end of the tube engaging said body coaxially of said bore, sealing means sealingly engaging said body end, and a portion defining an external thread having the same pitch as said body thread, and an annular nut having an internal thread engaging said body threaded end, a camming portion engaging said sleeve to urge said constrictible means into sealed engagement with the tube end and said sealing means sealingly against said body end as an incident of the threaded advance of said nut thread on said body threaded end, said external thread of the sleeve being arranged to be loosely threaded into said nut thread to retain said sleeve and nut in assembled relationship prior to and fully during make-up of the fitting while permitting said nut thread to move threadedly about said sleeve thread when said sleeve sealing means engages said body thereby to permit axial movement of said nut relative to said sleeve whereby said sleeve may be substantially rotatably fixed as said nut is advanced to the fully made-up disposition, said portion of the sleeve defining a substantialy right circularly cylindrical external surface from which asid thread upstands, the diameter of said surface being substantially similar to the tip diameter of the nut thread whereby said sleeve is retained accurately coaxially within the nut during make-up of the fitting.

References Cited

UNITED STATES PATENTS

| | | | |
|---|---|---|---|
| 2,766,998 | 10/1956 | Watts et al. | 285—341 X |
| 2,857,176 | 10/1958 | McTaggart et al. | 285—342 X |
| 3,218,096 | 11/1965 | Press | 285—342 X |
| 3,290,069 | 12/1966 | Davis | 285—341 |
| 3,332,709 | 7/1967 | Kowalski | 285—23 |

FOREIGN PATENTS

| | | |
|---|---|---|
| 561,711 | 6/1944 | Great Britain. |
| 887,760 | 1/1962 | Great Britain. |

DAVID J. WILLIAMOWSKY, Primary Examiner

D. W. AROLA, Assistant Examiner

U.S. Cl. X.R.

285—382.7